United States Patent [19]

Kondo

[11] Patent Number: 4,596,141

[45] Date of Patent: Jun. 24, 1986

[54] ELECTRICALLY OPERATED OIL LEVEL GAUGE

[75] Inventor: Seiichi Kondo, Kawagoe, Japan

[73] Assignee: Kabushiki Kaisha Tsuchiya Seisakusho, Tokyo, Japan

[21] Appl. No.: 610,550

[22] Filed: May 15, 1984

[30] Foreign Application Priority Data

Feb. 29, 1984 [JP] Japan .............................. 59-29183[U]

[51] Int. Cl.⁴ ........................ G01F 23/22; G08B 21/00
[52] U.S. Cl. ...................................... 73/295; 340/622; 33/126.7 R
[58] Field of Search .................. 73/118, 295; 340/620, 340/622, 59; 361/284; 33/126.7 R; 338/27; 174/117 PC

[56] References Cited

U.S. PATENT DOCUMENTS

| | | | |
|---|---|---|---|
| 2,705,372 | 4/1955 | Cornell | 33/126.7 R |
| 2,780,692 | 2/1957 | Hinojosa | 340/59 |
| 3,098,914 | 7/1963 | Giannino | 33/126.7 R |
| 3,147,554 | 9/1964 | Beattie | 33/126.7 R |
| 3,488,855 | 1/1970 | Howe | 33/126.7 R |
| 3,876,964 | 4/1975 | Balaster et al. | 174/117 PC |
| 4,186,604 | 2/1980 | Mattila | 73/295 |
| 4,266,344 | 5/1981 | Richardson | 33/126.7 R |
| 4,313,102 | 1/1982 | Broetto | 340/622 |
| 4,476,714 | 10/1984 | Barry et al. | 340/59 |

FOREIGN PATENT DOCUMENTS 0220669 11/1957 Australia .............................. 361/284
58-20315  2/1983 Japan .

Primary Examiner—Charles Frankfort
Assistant Examiner—Thomas B. Will
Attorney, Agent, or Firm—Schwartz, Jeffery, Schwaab, Mack, Blumenthal & Evans

[57] ABSTRACT

An electrically operated oil level gauge is composed of a flexible elongate bar whose one end section is provided with an oil level sensing element such as a thermistor. Additionally, a flexible elongate printed-wiring film is adhered on the surface of the flexible elongate bar so as to electrically connect the sensing element with a lead wire through which an electric current is supplied to the sensing element, thereby rendering the oil level gauge axially flexible while effectively preventing lead wire troubles.

3 Claims, 8 Drawing Figures

FIG. 1
FIG. 2A
FIG. 2B
FIG. 3
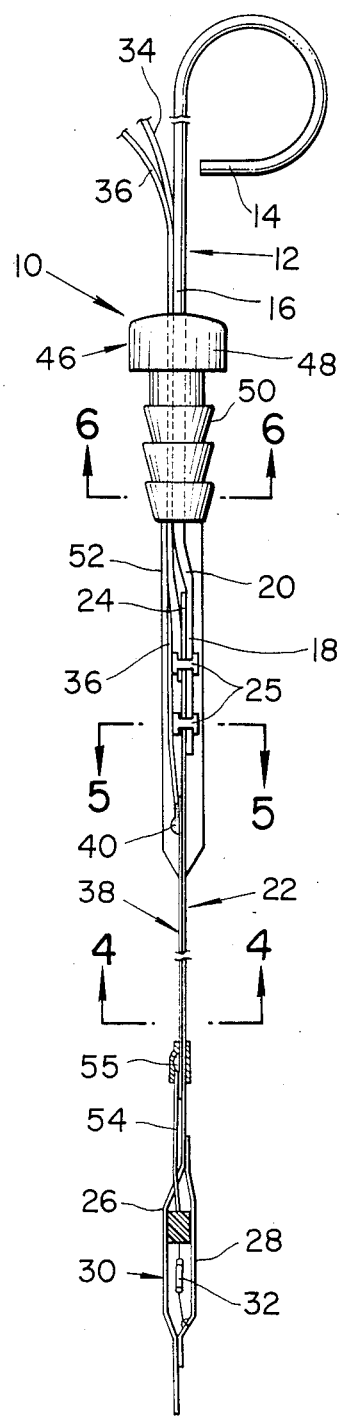
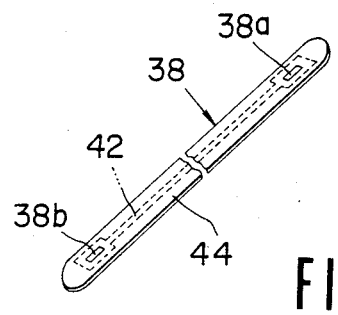
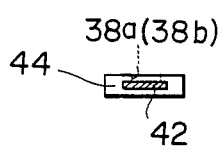
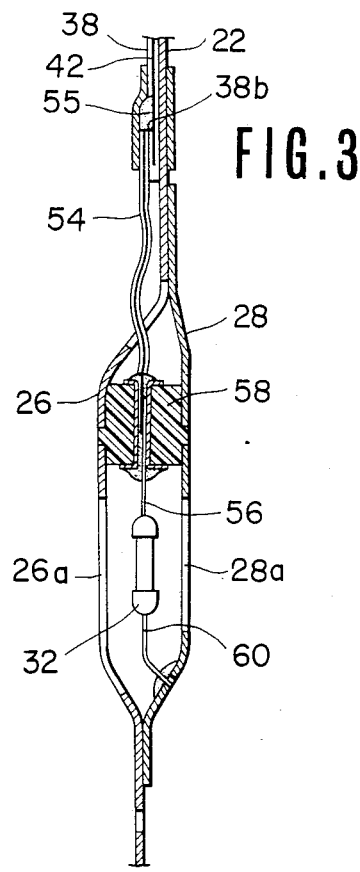

FIG.4 　FIG.5 　FIG.6
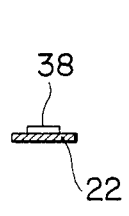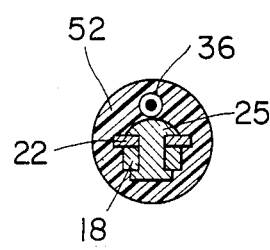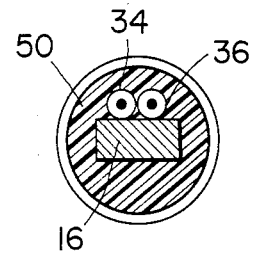
FIG.7
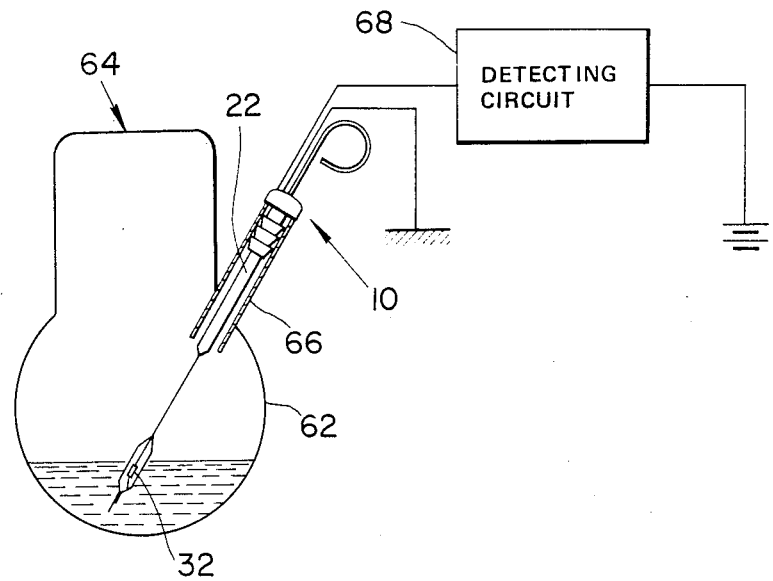

_ELECTRICALLY OPERATED OIL LEVEL GAUGE_

BACKGROUND OF THE INVENTION

1. Field of the Invention

This invention relates generally to an electrically operated oil level gauge for detecting the level of oil in an oil pan of an engine, and more particularly to an oil level gauge which is structured to be axially flexible so as to be suitable for practical use.

2. Description of the Prior Art

In connection with electrically operated oil level detecting devices, it has already been proposed that a dipstick be provided at its tip section with an oil level sensing element such as a thermistor which generates an electric signal when the level of oil in an oil pan drops below a bottom of a safety range.

However, such a dipstick is not structured to be axially flexible and is therefore not suitable for practical use for the reasons set forth below. In order to set and remove the dipstick, it is practically necessary that the dipstick be axially bendable because the dipstick is inserted into the oil pan through a pipe member which is usually bent; and the insertion and pulling-out of the dipstick cannot be carried out in its straight state due to obstruction by various engine parts and accessories.

SUMMARY OF THE INVENTION

An electrically operated oil level gauge according to the present invention comprises a flexible elongate bar whose upper end section is fixedly connected to a rigid stick serving as a pull. The flexible elongate bar is provided at its lower end section with an electrically operated oil level sensing element such as a thermistor. Additionally, a flexible printed-wiring film is adhered on the surface of the flexible elongate bar in order to electrically connect the sensing element with a lead wire forming part of an electric circuit. Accordingly, the oil level gauge can be axially flexible and therefore suitable for practical use while preventing lead wire troubles such as lead wire cutting or disconnecting.

BRIEF DESCRIPTION OF THE DRAWINGS

The features and advantages of the oil level gauge according to the present invention will be more clearly appreciated from the following description taken in conjunction with the accompanying drawings in which the same reference numerals designate the same parts and elements, in which:

FIG. 1 is a vertical section view of an embodiment of the oil level gauge according to the present invention;

FIG. 2A is a perspective view of a flexible printed-wiring film forming part of the oil level gauge of FIG. 1;

FIG. 2B is a transverse sectional view of the flexible printed-wiring film of FIG. 2A;

FIG. 3 is an enlarged vertical section of an essential part of the oil level gauge of FIG. 1;

FIG. 4 is a sectional view taken in the direction of arrows substantially along the line 4—4 of FIG. 1;

FIG. 5 is a sectional view taken in the direction of arrows substantially along the line 5—5 of FIG. 1;

FIG. 6 is a sectional view taken in the direction of arrows substantially along the line 6—6 of FIG. 1; and FIG. 7 is a schematic illustration showing a state in which the oil level gauge is located in position for use.

DETAILED DESCRIPTION OF THE INVENTION

Referring now to FIGS. 1 to 6, there is shown a preferred embodiment of an electrically operated oil level gauge or dipstick according to the present invention which gauge is used, in this instance, for detecting the level of engine lubricating oil in an internal combustion engine. The oil level gauge 10 comprises a stick 12 which is formed of a relatively thick steel sheet and accordingly substantially rigid. The stick 12 includes a curled upper end section 14 which serves as a pull with which the oil level gauge 10 is pulled out. The stick 12 further includes a flat and straight middle section 16 and a lower end section 18 which are integrally connected with each other through a bent or slope section 20 which is bent on the same side as the curled upper end section 14.

A bar or elongate member 22 is rigidly connected at its upper end section 24 to the stick lower end section 18 by way of caulking the heads of rivets 25. The bar 22 is formed of a relatively thin steel sheet and accordingly substantially flexible so that the oil level gauge is freely axially bendable in this elongate member 22. The bar 22 is bent at its lower end section 26 to form with an auxiliary bar 28 a protector housing 30 for an oil level sensing element 32. The auxiliary bar 28 is formed by being bent generally in the symmetrical shape relative to the bent lower end section 26 of the bar 22 and is secured generally oppositely to it. Since the bar 22 and the auxiliary bar 28 are formed of flat steel sheet, the protector housing 30 is open at its opposite sides so that the oil level sensing element 32 is readily contactable with the oil when the protector housing 30 is at or below the level of the oil. Additionally, as shown in FIG. 3, the bar lower end section 26 and the auxiliary bar 28 are formed with through-openings 26a, 28a, respectively, to allow more ready contact of the oil level sensing element 32 with the oil.

A negative or minus side lead wire 34 in the shape of a cord is disposed along the straight section 16 of the stick 12 and connected to the caulked head of the upper rivet 25 by way of soldering. A positive or plus side lead wire 36 in the shape of a code is similarly disposed along the stick straight section 16 and parallely with the lead wire 34, and connected to an upper terminal 38a of a printed-wire film or board 38 by way of soldering, forming a padding portion 40. The printed-wiring film 38 is very thin and includes a conductor 42 formed of copper leaf which is resistant to heat, oil and bending. The conductor 42 is covered with or embedded in an insulator film 44 made of polyamide resin. As clearly shown in FIGS. 2A and 2B, a part of the upper and lower ends of the conductor 42 is not covered with the insulator film 44 to form the upper terminal 38a and a lower terminal 38b. The adhesion of the printed-wiring film 38 onto the flexible bar 22 is made with a suitable adhesive which is excellent in heat-resistance and oil-resistance, so that the printed-wiring film 38 cannot be peeled off from the flexible bar 22 regardless of bending motion of the bar 22.

A seal member 46 is formed to sealingly cover the lower part of the middle section 16, the bent portion 20, and the lower end section 18 of the the stick 12, together with the upper part of the flexible bar 22 and the upper part of the printed-wiring film 38. Additionally, the lower part of the lead wires 34 and 35 are similarly sealingly covered with the seal member 46. The seal member 46 is formed of a molding of an elastic material such as plastics or rubber, and includes a stopper section 48 having an enlarged diameter, a sealing section 50 and a guide section 52. The sealing section 50 is circular in cross-section and is of a shape such as is formed by stacking a plurality of frustoconical members. The guide section 52 is generally cylindrical and extends downwardly to cover the connecting section of the stick lower end section 18 and the flexible bar upper end section 24.

As clearly shown in FIG. 3, a lead wire 54 in the type of a heat-resistant cord is connected at its one end with the lower terminal 38b of the printed-wiring film 38, forming a padding portion 55 which is covered with a heat-resistant tube (no numeral). The other end of the lead wire 54 is connected with the positive or plus side of the sensing element 32 through an exposed lead wire 56. The lead wire 56 is supported through a metal pipe (no numeral) by an insulative retainer 58 fixed on the inner surface of the protector housing 30. The negative or minus side of the sensing element 32 is connected through a lead wire 60 with the auxiliary bar 28 for grounding purpose.

The sensing element 32 in this embodiment is an NTC (Negative Temperature Coefficient) thermistor whose resistance decreases as temperature rises or as heat release therefrom is degraded. It is to be noted that the thermistor 32 is located at a predetermined position or a lowest safety oil level which is the lowest oil level of a safety range where there is a sufficient amount of the oil in the oil chamber thereby to maintain safe operation of the engine.

FIG. 7 shows the state in which the oil level gauge 10 of the present invention is located in position to detect the level of the engine lubricating oil in the oil chamber or an oil pan 62 of an internal combustion engine 64. The engine 64 is provided with a guide pipe 66 through which the oil level gauge 10 is inserted into the oil pan 62 to be dipped in the oil. In the working position of the oil level gauge 10 as illustrated in FIG. 7, the stopper section 48 of the seal member 46 is brought into contact with an upper end of the guide pipe 66 to locate the sensing element 32 at the predetermined position, in which the sealing section 50 tightly fits in the guide pipe 66 to maintain a gas tight seal in order to prevent blowby gas from emission to ambient air. It will be understood that the guide section 52 of the seal member 46 facilitates the insertion of the oil level gauge 10 through the guide pipe 66 while protecting the soldered joint sections such as the padding portion 40.

The negative side lead wire 34 is grounded while the positive side lead wire 36 is connected to a detecting circuit 68 which is arranged to receive an electric signal from the thermistor 32 which signal represents a state where the value of the resistance of the thermistor 32 decreases. The detection circuit 68 may generate a warning signal upon receipt of the above-stated electric signal from the thermistor 32.

With the thus arranged oil level gauge 10, when the sensing element or thermistor 32 is exposed to air, the heat release therefrom is degraded as compared with in the oil, so that the resistance value of the thermistor 32 decreases thereby to supply the electric signal to the detecting circuit 68. Thus, an operator or driver in a passenger compartment can be informed that the oil level has fallen below the lowest safety oil level.

As will be appreciated from the above discussion, according to the present invention, the flexible printed-wiring film is securely supported on the flexible bar of the oil level gauge and leads to the oil level sensing element. Therefore, the oil level gauge becomes axially flexible without causing lead wire troubles such as lead wire cutting or disconnecting. Additionally, since the printed-wiring film is very thin, the insertion and pulling-out of the oil level gauge through the guide pipe can be facilitated while preventing damage of lead wires and formation of short circuit.

What is claimed is:

1. An electrically operated oil level gauge for detecting a level of oil in an oil chamber, comprising:

a rigid stick serving as a pull with which to apply a force to the oil level gauge to insert said oil level gauge into the oil chamber through a pipe member, at least a part of said rigid stick being located outside of said pipe member and of the oil chamber;

a flexible elongate member connected to said rigid stick and insertable into the oil chamber through said pipe member, said flexible elongate member being formed of a steel sheet which is sufficiently thin to be freely axially bendable to smoothly follow the longitudinal shape of said pipe member, said flexible elongate member having a first end section, and a second end section fixedly connected to said rigid stick to provide a joint section, in which a second lead wire is connected with said flexible elongate member second end section through said joint section;

a flexible printed-wiring film securely supported on said flexible elongate member and having an elongate conductor, said flexible printed-wiring film including a plastic film in which said elongate conductor is embedded to be insulated, said elongate conductor being formed of a flexible metal leaf and having a first end connected with a first lead wire, and a second end;

an adhesive for adhering said flexible printed-wiring film on a surface of said flexible elongate member;

a protector housing formed at said first end section of said flexible elongate member;

an electrically operated oil level sensing element fixedly supported in said protector housing so as to be contactable with the oil, said sensing element being electrically connected with said printed-wiring film to form an electric circuit, said oil level sensing element being a thermistor connected to said elongate conductor second end;

an integral seal member formed of a molding of an elastic material to sealingly cover said joint section, a part of said first and second lead wires, and a part of said printed-wiring film to which said first lead wire is connected, said seal member including a sealing section which sealingly fits in said pipe member, and a stopper section capable of being brought into contact with an open end of said pipe member to locate said thermistor at a predetermined position.

2. An electrically operated oil level gauge as claimed in claim 1, wherein said protector housing is constructed of the first end section of said flexible elongate member, and an auxiliary member secured to said flexible elongate member first end section, said flexible elongate member and said auxiliary member being bent to form a space therebetween, said space being capable of being filled with the oil, said thermistor being located in said space.

3. An electrically operated oil level gauge as claimed in claim 1, wherein said flexible elongate member and said auxiliary member are electrically conductive, in which said thermistor is connected to said auxiliary member.

* * * * *